(12) United States Patent  
Aradachi et al.

(10) Patent No.: US 8,035,350 B2  
(45) Date of Patent: Oct. 11, 2011

(54) BATTERY CHARGER

(75) Inventors: Takao Aradachi, Ibaraki (JP); Shinji Watanabe, Ibaraki (JP); Kazuhiko Funabashi, Ibaraki (JP); Hiroyuki Hanawa, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 340 days.

(21) Appl. No.: 12/293,889

(22) PCT Filed: Mar. 8, 2007

(86) PCT No.: PCT/JP2007/055156
§ 371 (c)(1),
(2), (4) Date: Dec. 23, 2008

(87) PCT Pub. No.: WO2007/114016
PCT Pub. Date: Oct. 11, 2007

(65) Prior Publication Data

US 2009/0102428 A1    Apr. 23, 2009

(30) Foreign Application Priority Data

Mar. 31, 2006 (JP) .................. P2006-097427

(51) Int. Cl.
*H02J 7/04* (2006.01)
*H02J 7/06* (2006.01)
(52) U.S. Cl. ................... 320/152; 320/164
(58) Field of Classification Search ............ 320/152
See application file for complete search history.

(56) References Cited

U.S. PATENT DOCUMENTS

| 3,917,990 | A | 11/1975 | Sherman | |
|---|---|---|---|---|
| 5,410,238 | A | 4/1995 | Ishizuka et al. | |
| 5,637,982 | A * | 6/1997 | Nanno et al. | 320/150 |
| 5,973,480 | A * | 10/1999 | Takano et al. | 320/152 |
| 6,025,698 | A * | 2/2000 | Kim et al. | 320/132 |
| 6,278,261 | B1 | 8/2001 | Sakakibara | |
| 2002/0036482 | A1 | 3/2002 | Nakatsuji | |
| 2003/0085690 | A1 * | 5/2003 | Shiojima | 320/164 |
| 2004/0145352 | A1 | 7/2004 | Harrison | |

FOREIGN PATENT DOCUMENTS

| EP | 1710889 A2 | 10/2006 |
|---|---|---|
| JP | 02-192670 | 7/1990 |
| JP | 4-340330 | 11/1992 |
| JP | 2002-058171 | 2/2002 |

OTHER PUBLICATIONS

Chinese Office Action, with English translation, issued in Chinese Patent Application No. 200780012226.1, mailed Jun. 11, 2010.

* cited by examiner

*Primary Examiner* — M'Baye Diao
(74) *Attorney, Agent, or Firm* — McDermott Will & Emery LLP (57) ABSTRACT

A setting current switching circuit 120 includes a comparator 127. A battery temperature signal corresponding to a battery temperature detected by a battery temperature detecting unit 8 is inputted to one input terminal (−) of the comparator 127 and a reference signal corresponding to a reference temperature is inputted to the other input terminal (+) of the comparator 127 to vary the setting charging current value of a charging current setting unit 80 and the setting full-charge current value of a full-charge current setting unit 90 correspondingly to the output of the comparator 127.

7 Claims, 3 Drawing Sheets

BATTERY CHARGER

TECHNICAL FIELD

The present invention relates to a battery charger of a secondary battery, and more particularly to a battery charger preferably suitable for charging a battery pack that requires a constant current/constant voltage control system such as a lithium battery (including a lithium ion battery).

BACKGROUND ART

As a power source for driving a cordless electric tool, used is a secondary battery having a capacity relatively increased such as a nickel hydrogen battery or a NiCd battery. As the secondary battery having a capacity more increased and a weight more decreased, a lithium battery including a lithium ion battery has been progressively practically used.

The lithium battery has features that the nominal voltage of the cell is about three times as high as that of the nickel hydrogen battery or the NiCd battery widely put to practical use, and the battery is compact and light. Further, the lithium battery has features that the battery has good discharge efficiency, the battery can be discharged even in an environment of relatively low temperature and the battery can obtain a stable voltage in a wide range of temperature.

The lithium battery (battery pack) is ordinarily charged under a constant current/constant voltage control. However, it is generally known that to overcharge the battery under the constant current/constant voltage control is undesirable in view of the characteristics or the life of the battery. Accordingly, for instance, as disclosed in JP-A-2-192670, a method is proposed that while a battery is charged under a constant voltage, the charging current of a charging power circuit is detected, and when the charging current is lowered to a value not higher than a prescribed value, the battery is decided to be fully charged to generate a charging stop signal, interrupt a charging path of the charging power circuit and finish a charging operation.

Further, when the battery is ordinarily charged by a relatively large current, the battery can be charged in a short time. However, when a battery temperature at the time of charging the battery is low, the cycle life of the battery is short. Accordingly, a battery charger is proposed in which in the beginning of a charging operation, a battery is charged by a relatively small current, and when the battery temperature rises to a prescribed value during the charging operation, a charging current is increased stepwise to charge the battery in a short time. For instance, such a technique is disclosed in JP-A-4-340330.

DISCLOSURE OF INVENTION

However, in order to increase the charging current stepwise in accordance with the rise of the battery temperature, since the battery temperature and the charging current need to be monitored, a method may be considered that uses a relatively expensive circuit device such as a microcomputer, however, a problem arises that the method is disadvantageous in view of cost.

Further, in a battery charger in which a battery such as the lithium battery is charged under the constant current/constant voltage control to detect an end current and finish a charging operation, not only the charging current is simply increased in accordance with the rise of the battery temperature, but also the end current needs to be changed at the same time to decrease a charging time.

Accordingly, it is an object of the present invention to provide a battery charger that can be formed with a relatively simple circuit and can select a proper charging current correspondingly to the temperature of a battery.

It is another object of the present invention to provide an inexpensive battery charger that can vary the set current value of a full charge correspondingly to the temperature of a battery in a battery charger for charging a secondary battery (battery pack) such as a lithium battery under a constant current/constant voltage control system.

Representative features of the present invention disclosed to solve the above-described problems will be described below.

According to one feature of the present invention, a battery charger comprises: a charging current control circuit for setting a charging current value by a charging current setting unit to control a charging current to the set charging current value; a full-charge detecting circuit for setting a full-charge current value corresponding to a current value during a full charged state by a full-charge current setting unit to generate a charging stop signal when the charging current is not higher than the set full-charge current value; and a battery temperature detecting unit for detecting the battery temperature of a secondary battery to be charged. The battery charger includes: a setting current switching circuit having a comparator for inputting a battery temperature signal corresponding to the battery temperature detected by the battery temperature detecting unit to one input terminal of the comparator and a reference signal corresponding to a reference temperature to the other input terminal of the comparator to vary the set charging current value of the charging current setting unit and the set full-charge current value of the full-charge current setting unit correspondingly to the output of the comparator.

According to a still another feature of the present invention, the battery temperature detecting unit detects the resistance change of a temperature sensing element incorporated in the secondary battery to be charged.

According to a still another feature of the present invention, the charging current setting unit and the full-charge current setting unit include a voltage dividing resistance circuit, and the set charging current value and the set full-charge current value are switched depending on whether or not a voltage dividing value adjusting resistance is connected in parallel with a voltage dividing resistance forming the voltage dividing resistance circuit in accordance with the output of the setting current switching circuit.

According to a still another feature of the present invention, the battery temperature is a low temperature within a prescribed temperature range, the setting current switching circuit sets the set charging current value and the set full-charge current value to values lower than those at high temperature.

According to a still another feature of the present invention, the set charging current value, the set full-charge current value, the battery temperature signal and the reference signal represent voltage values respectively corresponding to the set charging current value, the set full-charge current value, the battery temperature and the reference temperature.

According to a still another feature of the present invention, the secondary battery to be charged is a lithium battery charged under a constant current/constant voltage control.

According to a still another feature of the present invention, the charging current control circuit has a second comparator, a charging signal responding to the charging current is inputted to one input terminal of the second comparator and a set charging signal corresponding to the set charging current value set in accordance with the output of the setting current switching circuit is inputted to the other input terminal of the second comparator, and the full-charge detecting circuit has a third comparator, a charging signal responding to the charging current is inputted to one input terminal of the third comparator and a set full-charge signal corresponding to the set full-charge current value set in accordance with the output of the setting current switching circuit is inputted to the other input terminal of the third comparator and the set charging current value and the set full-charge current value are varied relative to temperature by the setting current switching circuit.

According to the present invention, since the comparator is used so that the charging current and of the secondary battery to be charged and the setting current of a full-charge can be selected to proper current values correspondingly to the battery temperature, the battery charger can be provided that can be formed with a relatively simple circuit. Further, since the setting current value of the full-charge can be varied correspondingly to the temperature of the battery, the battery charger is preferably suitable for a battery charger for charging the secondary battery (battery pack) such as the lithium battery under the constant current/constant voltage control system.

The above-described and other objects of the present invention and the above-described and other features and advantages will be more apparent from the following description of the specification and the attached drawings.

BEST MODE FOR CARRYING OUT OF THE INVENTION

Now, one embodiment of the present invention will be described in detail by referring to FIGS. 1 to 4.

Figure 1:
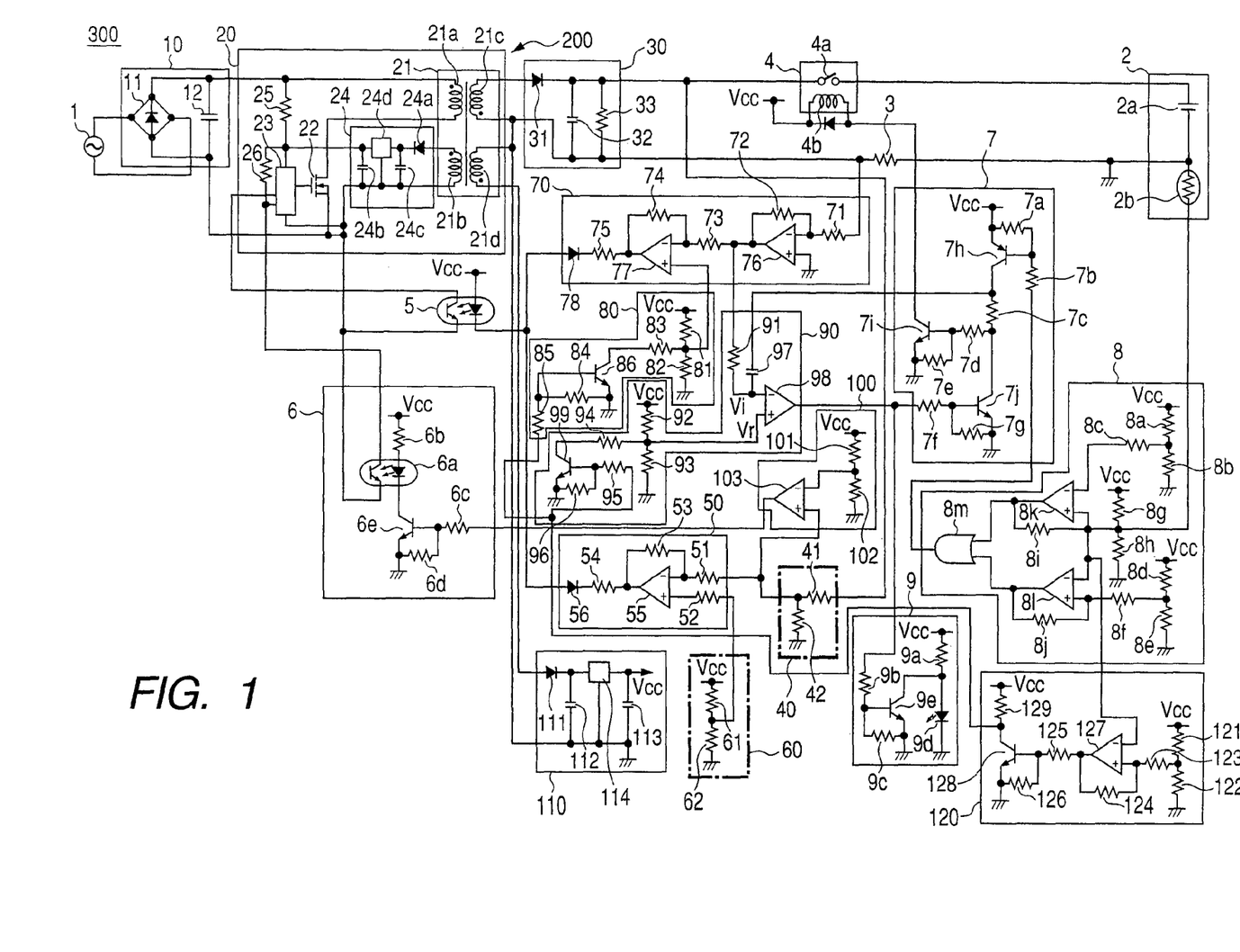
FIG. 1 is a circuit diagram of a battery charger according to one embodiment of the present invention.

FIG. 1 shows a circuit diagram of a battery charger 300 according to one embodiment of the present invention. In FIG. 1, a battery pack (a secondary battery) 2 to be charged by the battery charger 300 includes a single or a plurality of, for instance, lithium battery batteries 2a connected in series that can be charged, and a temperature sensing element 2b functioning as a temperature detecting sensor such as a thermistor arranged in contact with or closely to the battery 2a. For instance, in the battery pack 2 of this embodiment, the battery 2a is composed of one lithium ion battery (nominal voltage of 3.6 V). As the temperature sensing element 2b, the thermistor is used.

A charging power circuit 200 for supplying a charging electric power to the battery pack 2 is formed with a switching power circuit including a primary side rectifying and smoothing circuit 10, a switching circuit 20 including a high frequency transformer 21 and a secondary side rectifying and a smoothing circuit 30.

The primary side rectifying and smoothing circuit 10 includes a full-wave rectifying circuit 11 and a smoothing condenser 12, and full-wave rectifies an ac power source 1 such as a commercial ac power source.

The switching circuit 20 includes the high frequency transformer 21, a MOSFET (a switching element) 22 connected in series to the primary winding 21a of the transformer 21 and a PWMIC (a switching control IC) 23 for modulating a pulse width of a driving pulse signal applied to the gate electrode of the MOSFET 22.

A driving power of the PWMIC 23 is supplied from a constant voltage circuit 24 formed in the secondary winding 21b of the transformer 21. The constant voltage circuit 24 includes a rectifying diode 24a, a three-terminal regulator 24d, a condenser 24c connected to an input side of the three-terminal regulator 24d and a condenser 24b connected to an output side of the three-terminal regulator 24d. To the PWMIC 23, a charging voltage control signal and a charging current control signal are fed back through a charging feedback signal transmitting unit 5 composed of a photo-coupler. Further, to the PWMIC 23, a switching stop control signal is fed back by a photo-coupler 6a forming a below-described switching stop circuit 6. The PWMIC 23 controls the start and stop of the charging operation of the MOSFET 22 by the switching stop control signal from the photo-coupler 6a and changes a driving pulse width supplied to the gate electrode of the MOSFET 22 by the charging current control signal from the photo-coupler 5 to control the turning on time of the MOSFET 22 and adjust the output voltage of the secondary side rectifying and smoothing circuit 30 and the charging current of the battery pack 2. To the PWMIC 23, the output voltage of the primary side rectifying and smoothing circuit 10 is supplied through a starting resistance 25 during starting. Further, to the PWMIC 23 to which the switching stop control signal from the photo-coupler 6a, a pull-up resistance 26 is connected. Under an operating state that the switching transistor 6e of the below-described switching stop circuit 6 is turned off, an operating potential is applied to the PWMIC 23 by the pull-up resistance 26.

The secondary side rectifying and smoothing circuit 30 includes a diode 31 connected to a tertiary winding 21c of the transformer 21, a smoothing condenser 32 and a discharging resistance 33.

In a quarterly winding 21d of the transformer 21, a constant voltage power source 110 for a control circuit for supplying the power Vcc of below-described various kinds of control circuits is formed. The constant voltage power source 110 for the control circuit includes a rectifying diode 111, a three-terminal regulator 114, a condenser 112 connected to an input side of the three-terminal regulator 114 and a condenser 113 connected to an output side of the three-terminal regulator 114 to output a constant voltage Vcc.

The primary side rectifying and smoothing circuit 10, the switching circuit 20 and the secondary side rectifying and smoothing circuit 30 form the charging power circuit 200. Between the output side of the charging power circuit 200 and the battery pack 2, a switching unit 4 for controlling a charging path to be opened and closed (on and off) is electrically connected. The switching unit 4 is formed with, for instance, a relay, and includes a relay switch 4a and a control coil 4b. The control coil 4b is controlled by a relay control circuit 7.

The relay control circuit 7 includes a transistor 7h controlled to be turned on and off by the output of a below-described battery temperature detecting circuit 8, a transistor 7i whose base is connected to the collector side of the transistor 7h, and a transistor 7j controlled to be turned on and off by the output of a below-described full-charge detecting circuit 90 and connected in series to the transistor 7h, and has resistances 7a to 7g provided in association with the transistors 7h, 7i and 7j.

A charging current control circuit 70 includes an operational amplifying circuit having operational amplifiers 76 and 77, input resistances 71 and 73 of the operational amplifiers 76 and 77, feedback resistances 72 and 74 of the operational amplifiers 76 and 77 and an output circuit including a diode 78 and a current limiting resistance 75. To one input terminal (+) of the operational amplifier 77, a charging current setting circuit 80 is connected.

Though especially limited, the charging current setting circuit 80 includes a basic voltage dividing resistance circuit having voltage dividing resistances 81 and 82. Further, with the voltage dividing resistance 82, a voltage dividing value adjusting resistance 83 and a transistor 86 are connected in parallel. The base of the transistor 86 is connected to a below-described setting current switching circuit (a charging current/end current switching circuit) 120 through a resistance 84 and a resistance 85. To the voltage dividing resistances 81 and 82, the output voltage Vcc of the constant voltage power source 110 for the control circuit is supplied. The charging current setting circuit 80 turns on or off the transistor 86 in accordance with a battery temperature detected by the below-described battery temperature detecting circuit 8 to vary a setting voltage value (a setting charging signal) corresponding to a setting charging current value inputted to the (+) input terminal of the operational amplifier 77 depending on whether or not the voltage dividing value adjusting resistance 83 is connected in parallel with the voltage dividing resistance 82. For instance, if the battery temperature changes to a temperature higher than a reference temperature, as a result, the transistor 86 is turned off so that the resistance 83 is not connected in parallel with the resistance 82 to directly set a setting voltage obtained by dividing the voltage by the resistances 81 and 82 to the setting voltage value (the setting charging signal). On the contrary, when the battery temperature changes to a temperature lower than the reference temperature, the transistor 86 is turned on and the resistance 83 is connected in parallel with the resistance 83 so that a combined parallel resistance value of the resistance 82 and the resistance 83 is lowered and the setting voltage value obtained by dividing the voltage by the resistance 81 and the combined resistance is low. Accordingly, the charging current is set to a low level at the low temperature and to a high level at the high temperature.

An input side of the charging current control circuit 70 is connected to a charging current detecting resistance 3 for detecting the charging current of the battery pack 2. Further, the output side thereof controls the PWMIC 23 through the charging feedback signal transmitting unit 5 composed of the photo-coupler as described above.

In the charging current control circuit 70, a voltage drop based on the charging current supplied to the charging current detecting resistance 3 is inverted and amplified by the resistances 71 and 72 and the operational amplifier 76 to amplify the difference between an output voltage thereof and the setting voltage value (the setting charging signal) set by the charging current setting circuit 80 by the operational amplifier 77, feed back the amplified voltage to the PWMIC 23 through the charging feedback signal transmitting unit 5 and control the switching operation of the MOSFET 22. That is, when the charging current supplied to the charging current detecting resistance 3 is larger than a prescribed charging current, the MOSFET 22 applies an output pulse whose pulse width is narrowed to the high frequency transformer 21. On the contrary, when the charging current is smaller than the prescribed charging current, the MOSFET 22 applies the pulse whose pulse width is widened to the high frequency transformer 21. Thus, the secondary side rectifying and smoothing circuit 30 smoothes a dc voltage corresponding to the prescribed charging current to maintain the charging current of the battery pack 2 to the prescribed current set by the charging current setting circuit 80. In other words, the current detecting resistance 3, the charging current control circuit unit 70, the charging feedback signal transmitting unit 5, the switching circuit 20 and the secondary side rectifying and smoothing circuit 30 control the charging current supplied to the battery pack 2 so as to have the setting charging current value set by charging current setting circuit 80.

An output voltage control circuit 50 includes an operational amplifier 55, an input resistance 51 of an inverse input terminal (−) side, a feedback resistance 53, an input resistance 52 of a non-inverse input terminal (+) side, and an output circuit having a diode 56 and a current limiting resistance 54. The inverse input terminal (−) side of the output voltage control circuit 50 is connected to an output voltage detecting circuit 40 of a charging power source including a resistance 41 and a resistance 42, and a detected voltage for feeding back of the output voltage of the charging power circuit 200 is inputted thereto. On the other hand, the non-inverse input terminal (+) side is connected to an output voltage setting circuit 60 having voltage dividing resistances 61 and 62 for dividing a supply voltage Vcc to set a prescribed voltage for a constant voltage charging operation. In this embodiment, since the battery pack 2 is composed of one lithium ion battery, an output voltage may be set to, for instance, 4.2 V. The output side of the output voltage control circuit 50 is connected to the PWMIC 23 through the charging feedback signal transmitting unit 5 composed of the photo-coupler like the output side of the charging current control circuit 70. In such a structure, the difference between a detected output voltage from the output voltage detecting circuit 40 and a setting reference voltage from the output voltage setting circuit 60 is amplified to feed back the amplified voltage to the PWMIC 23 through the charging feedback signal transmitting unit 5 and control the output voltage to the prescribed value. Accordingly, the PWMIC 23 is controlled by the output signal (the feedback signal) of the charging current control circuit 70 or the output voltage control circuit 50.

The battery temperature detecting circuit 8 is a battery temperature detecting unit for operating the battery charger 300 only when the temperature of the battery pack 2 is located within a prescribed temperature range (for instance, −10° C. to 50° C.) and includes a window comparator (a voltage comparator) using an OR gate. Specifically, the battery temperature detecting circuit 8 includes a first voltage comparator having an operational amplifier 8k, a feedback resistance 8i and an input resistance 8c and a second voltage comparator including an operational amplifier 8l, a feedback resistance 8j and an input resistance 8f. To the reference input terminal (−) of the operational amplifier 8k forming the first comparator, a reference voltage (a lower limit reference signal) corresponding to a lower limit temperature (−10° C.) obtained by dividing the supply voltage Vcc by voltage dividing resistances 8a and 8b is applied. To the reference input terminal (+) of the operational amplifier 8l forming the second voltage comparator, a reference voltage (an upper limit reference signal) corresponding to an upper limit temperature (50° C.) obtained by dividing the supply voltage Vcc by voltage dividing resistances 8d and 8e is applied. Further, to the signal input terminal (+) of the operational amplifier 8k and the signal input terminal (−) of the operational amplifier 8l, a voltage change based on the change of a resistance value of the temperature sensing element 2b relative to temperature is inputted through a voltage dividing circuit having the supply voltage Vcc and resistances 8g and 8h. Both the output signals of the operational amplifiers 8k and 8l are inputted to an OR gate 8m. The OR output of the OR gate 8m is inputted to the base of the transistor 7h of the relay control circuit 7 through the resistance 7b. The operation of the relay control circuit 7 can be controlled within the temperature range (−10° C. to 50° C.) where the battery pack 2 is permitted to be charged by the battery temperature detecting circuit 8.

An LED (a light emitting diode) display circuit 9 is a monitor circuit for allowing a user to recognize the start or the end of a charging operation and includes a displaying LED 9d, a driving transistor 9e and resistances 9a to 9c. For instance, the displaying LED 9d is controlled to be turned on during the charging operation and turned off during finishing the charging operation.

An over-voltage detecting circuit 100 includes an operational amplifier 103 functioning as a voltage comparator and voltage dividing resistances 101 and 102 connected to one input terminal (−) of the operational amplifier 103 to set a voltage corresponding to an over-voltage. To the other input terminal (+) of the operational amplifier 103, divided voltage obtained by dividing the output voltage of the secondary side rectifying and smoothing circuit 30 by the resistances 41 and 42 of the output voltage detecting circuit 40 is inputted. The output of the over-voltage detecting circuit 100 is connected to the switching stop circuit 6.

The switching stop circuit 6 is provided to stop the operation of the PWMIC 23 in response to a signal from the over-voltage detecting circuit 100 and includes a photo-coupler 6a, resistances 6b to 6d and a switching transistor 6e.

The full-charge detecting circuit 90 includes an operational amplifier 98 functioning as a voltage comparator. To one input terminal (−) of the operational amplifier 98, a voltage corresponding to the charging current supplied to the charging current detecting resistance 3 is inputted through the operational amplifier 76 and a resistance 91. To the other input terminal (+) of the operational amplifier 98, an intermediate point of series resistances 92 and 93 forming a voltage dividing resistance circuit is connected. To the voltage dividing resistance 93, the collector of a transistor 99 is connected through a voltage dividing value adjusting resistance 94. To the base of the transistor 99, the below-described setting current switching circuit 120 is connected through a resistance 95 and a resistance 96. The full-charge detecting circuit 90 turns on or off the transistor 99 inn accordance with the battery temperature detected by the below-described battery temperature detecting circuit 8 to vary a setting full-charge current value (a setting full-charge signal) inputted to the input terminal (+) of the operational amplifier 98 depending on whether the voltage dividing value adjusting resistance 94 is connected in parallel with the voltage dividing resistance 93. For instance, if the battery temperature changes to a temperature higher than a reference temperature, as a result, the transistor 99 is turned off so that the resistance 94 is not connected in parallel with the resistance 93 and a reference voltage value obtained by dividing the voltage by the resistances 92 and 93 corresponds to the setting full-charge current value. On the contrary, when the battery temperature changes to a temperature lower than the reference temperature, as a result, the transistor 99 is turned on so that the resistance 94 is connected in parallel with the resistance 93, a combined parallel resistance value of the resistance 93 and the resistance 94 is lowered and a voltage value obtained by dividing the voltage by the resistance 92 and the combined resistance is low. Accordingly, the corresponding setting full-charge current value can be set to a low voltage value at the low temperature and to a high voltage value at the high temperature.

The output of the full-charge detecting circuit 90 (the output of the voltage comparator 98) is applied to the base of the transistor 7j of the relay control circuit 7 as a charging start signal or a charging stop signal to control the transistor 7j to be turned on and off. In the operation during an ordinary charging operation, when the value (a charging signal) obtained by converting the charging current to the voltage that is applied to the other input terminal (−) of the operational amplifier 98 is lower than the value (the setting full-charge signal) obtained by converting the setting full-charge current value to the voltage that is inputted to one input terminal (+) of the operational amplifier 98, the transistor 7j is turned on so that the transistor 7i is turned off to interrupt the relay 4 by the relay control circuit 7. On the contrary, when the charging current is high, the transistor 7j is turned off to turn on the transistor 7i so that the relay 4 is controlled to be electrically conducted. Namely, since the lithium ion battery of the battery pack 2 has characteristics that the charging current is decreased (lowered) during the charging operation under the constant voltage control, the full-charge detecting circuit 90 compares the charging current with a reference current showing a fully charged state by the comparator 98 and decides a state when the charging current is lowered to a value not higher than the reference current as the fully charged state to control the relay 4 to be interrupted by the output of the comparator 98 and stop the charging operation. In this case, according to the present invention, the setting value of the charging current and the setting value of the full-charge current can be varied in accordance with the battery temperature as described above.

Here, it is to be paid attention to that when the charging current has a value not higher than a prescribed charging current value (a setting current value), the full-charge detecting circuit 90 has a function for controlling the relay 4 to be interrupted. Accordingly, even when the battery pack 2 as the battery to be charged is merely inserted (connected) into the battery charger 300 to charge the battery pack, if the charging current not lower than the setting current value is not supplied, the relay 4 still maintains an interrupted state so that the output voltage of the charging power circuit 200 cannot be fed to the battery pack 2. That is, the full-charge detecting circuit 90 makes it impossible to start the relay control circuit 7. To solve this problem, according to the present invention, to the one input terminal (−) to which a signal responding to the charging current of the comparator 98 is applied, a starting voltage applying unit 97 is connected for applying a voltage (a starting signal) not lower than a setting voltage corresponding to the setting value of the charging current set to the other input terminal (+) by the resistances 92 and 93 during a transient state till a prescribed time elapses from the start of the charging operation. One example of the starting voltage applying unit 99 is formed with the condenser 97 connected between the one input terminal (−) of the comparator 98 and the collector of the transistor 7h of the relay control circuit 7. When the battery temperature detecting circuit 8 detects that the battery pack 2 to be charged is connected to the battery charger 300, since the transistor 7h of the relay control circuit 7 is turned on, the supply voltage Vcc can be inputted to the one input terminal (−) of the comparator 98 as the starting signal by the condenser 97 during the transient state until the prescribed time elapses from the start of the charging operation. As a result, the comparator 98 of the full-charge detecting circuit 90 turns off the transistor 7j of the relay circuit 7, so that the transistor 7i can be turned on to control the relay 4 to be electrically conducted (the relay is turned on). Thus, the charging operation can be started.

The setting current switching circuit 120 functions as a switching and driving circuit including an operational amplifier 127, a transistor 128 and resistances 121 to 126 and 129 to vary the setting charging current and the setting full-charge current (the end current). The operational amplifier 127 functions as a voltage comparator. To one input terminal (−) of the operational amplifier 127, the voltage responding to the resistance change of the temperature sensing element 2b incorporated in the battery pack 2 relative to temperature is applied. To the other input terminal (+) of the operational amplifier 127, an intermediate point of the resistances 121 and 122 connected in series that form a voltage dividing resistance circuit is connected through the resistance 123. To the output of the operational amplifier 127, the transistor 128 is connected. The collector output of the transistor 128 is inputted to the base of transistor 99 of the full-charge detecting circuit 90 and the base of the transistor 86 of the charging current setting circuit 80. When a voltage value inputted to the input terminal (−) of the operational amplifier 127 from the battery temperature detecting circuit 8 is higher (at the time of the low temperature) than a reference value as a voltage divided value by the voltage dividing resistances 121 and 122 that is inputted to the input terminal (+) of the operational amplifier 127, the transistor 128 is turned off by the output of the operational amplifier 127. Thus, the transistors 86 and 99 in the charging current setting circuit 80 and the full-charge detecting circuit 90 are turned on so that the setting charging current and the setting full-charge current (the end current) are set to low levels as described above.

As apparent from the above description, the setting current switching circuit 120 forms a setting current varying unit together with the charging current setting circuit 80 and the full-charge detecting circuit 90.

Now, an operation of the battery charger 300 during the charging operation will be described below.

When the battery pack 2 as the secondary battery to be charged is inserted into or connected to the battery charger 300, a value obtained by dividing the constant voltage Vcc by the combined resistance of the thermistor 2b having a resistance value responding to a battery temperature and the resistance 8h and the resistance 8g is inputted to the input terminal (+) of the operational amplifier 8k and the input terminal (−) of the operational amplifier 8l. The operational amplifier 8k sets a value obtained by dividing the constant voltage Vcc by the voltage dividing resistances 8a and 8b as a reference, and outputs a high output when the battery temperature is not higher than a prescribed temperature in a low temperature side and outputs a low output when the battery temperature is not lower than the prescribed temperature. For instance, the prescribed temperature is set to −10° C. On the other hand, the operational amplifier 8l has a value obtained by dividing the constant voltage Vcc by the voltage dividing resistances 8d and 8e as a reference, and outputs the low output when the battery temperature is not higher than a prescribed temperature in a high temperature side and outputs the high output when the battery temperature is not lower than the prescribed temperature in the high temperature side. For instance, the prescribed temperature in the high temperature side is set to 50° C.

As described above, when the voltage value of the reference input terminal side of a pair of the operational amplifiers 8k and 8l operating as the voltage comparators is set to the prescribed value, if the range of the battery temperature of the battery pack 2 is located within the range of −10° C. to 50° C., both the two input levels of the OR gate 8m are low. Thus, the output level of the OR gate 8m is low. When the battery temperature of the battery pack 2 is not higher than −10° C. or not lower than 50° C., at least one input level of the two inputs of the OR gate 8m is high. Thus, the output level of the OR gate 8m is high.

The output of the OR gate 8m is inputted to the base of the transistor 7h. Accordingly, when the low output is inputted to the base of the transistor 7h, in other words, only when the battery temperature is located within the temperature range of −10° C. to 50° C., the transistor 7h is turned on. The transistor 7h is turned on so that the voltage Vcc is transiently applied to the charging signal input terminal (−) of the operational amplifier 98 functioning as the voltage comparator as a charging start signal through the condenser 97 as described above. The starting signal Vi is transiently applied for a time corresponding to the electrostatic capacity of the condenser 97.

At this time, since the supply voltage Vcc is transiently inputted to the charging signal input terminal (−) of the operational amplifier 98 through the condenser 97 till the prescribed time elapses after the battery pack 2 is connected to the battery charger 300, the voltage is sufficiently higher than the setting voltage Vr (the setting full-charge signal) inputted to the setting signal input terminal (+) of the operational amplifier 98. Thus, the output level of the operational amplifier 98 shows a low output (the charging start signal).

Before the battery pack 2 whose battery temperature is located within the range of −10° C. to 50° C. is inserted into the battery charger 300, since voltage is not applied to the charging signal input terminal (−) of the operational amplifier 98, the voltage Vi inputted to the charging signal input terminal (−) of the operational amplifier 98 is 0V. Thus, the voltage Vi is lower than the setting voltage Vr inputted to the setting signal input terminal (+) of the operational amplifier 98 and the output level of the operational amplifier 98 shows a high output. Accordingly, when the battery pack 2 having the battery temperature located within the range of −10° C. to 50° C. is inserted into the battery charger 300, an input to the base of the transistor 7j is changed to a low state from a high state to change the transistor 7j from on to off. Thus, the base of the transistor 7i is changed to a high input from a low input to turn on the transistor 7i and apply the voltage Vcc to the control coil 4b of the relay 4. Thus, the relay switch 4a is turned on.

Under the transient state, when the charging start signal is inputted to the charging signal input terminal (−) of the operational amplifier 98 by the condenser 97 to turn on the relay 4, the charging current begins to be supplied at the same time. The voltage drop in the charging current detecting resistance 3 is inputted to an inverting and amplifying circuit formed by the operational amplifier 76 and the resistances 71 and 72. At this time, the output (a value obtained by converting the charging current to voltage) of the inverting and amplifying circuit (the operational amplifier 76) is inputted to the charging signal input terminal (−) of the operational amplifier 98 as the voltage Vi. At this time, when the input voltage Vi (the voltage corresponding to the detected charging current value) of the charging signal input terminal (−) of the operational amplifier 98 is not lower than the setting voltage Vr (corresponding to the end current of a full charged state) inputted to the setting signal input terminal (+) of the operational amplifier 98, even after the transient voltage Vcc is completely applied, the input voltage Vi still maintains a value not lower than the setting value Vr. Thus, the output level of the operational amplifier 98 continuously maintains a low level to continuously turn on the relay 4 and continuously carry out the charging operation.

When the battery pack 2 is continuously charged and the battery voltage thereof reaches a constant voltage value (for instance, 4.2 V), the control is changed to a constant voltage control and the charging current falls. Then, when the input voltage Vi (corresponding to a present charging current value) of the charging signal input terminal (−) of the operational amplifier 98 is not higher than the setting value Vr (corresponding to the end current for detecting the full charged state) obtained by dividing the voltage Vcc by the ratio of the voltage dividing resistances 92 and 93 (or the ratio of the resistance 92 and the combined parallel resistance of the resistances 93 and 94) that is inputted to the setting signal input terminal (+) of the operational amplifier 98, the output level of the operational amplifier 98 becomes high. Thus, the transistor 7j is turned on to input a low output to the base of the transistor 7i. Accordingly, the relay 4 is turned off to finish the charging operation.

In the above-described structure, since the resistance of the temperature sensing element 2b such as the thermistor ordinarily has a negative temperature coefficient, the resistance value of the temperature sensing element 2b becomes low as the battery temperature of the battery pack 2 rises. Thus, when the voltage divided value of the resistance 121 and the resistance 122 that is a reference value of the operational amplifier 127 of the setting current switching circuit 120 is set so that the battery temperature corresponds to, for instance, 0° C., if the battery temperature during the charging operation is not higher than 0° C., since the input voltage value inputted to the input terminal (−) of the operational amplifier 127 of the setting current switching circuit 120 is higher than the reference value, the output of the operational amplifier 127 is low. Accordingly, the transistor 128 of the setting current switching circuit 120 is turned off, so that the transistors 86 and 99 in the charging current setting circuit 80 and the full-charge detecting circuit 90 are respectively turned on.

Thus, referring to the voltage dividing ratio of the supply voltage Vcc by the resistances 81 and 82 of the charging current setting circuit 80, since the transistor 86 is turned on to connect the resistance 83 in parallel with the resistance 82, the voltage dividing ratio of the resistance 81 and the combined parallel resistance of the resistance 83 and the resistance 82 is lower than the voltage dividing ratio of the resistance 81 and the resistance 82. Thus, the setting voltage value corresponding to the setting charging current value inputted to the input terminal (+) of the operational amplifier 77 is low. Therefore, the charging current control circuit 70 supplies the charging current when the battery temperature is low to the battery pack 2. Similarly, referring to the voltage dividing ratio of the supply voltage Vcc by the resistance 92 and the resistance 93, since the transistor 99 is turned on to connect the resistance 94 in parallel with the resistance 93, the voltage dividing ratio of the resistance 92 and the combined parallel resistance of the resistance 93 and the resistance 94 is lower than the voltage dividing ratio of the resistance 92 and the resistance 93, the setting voltage value corresponding to the setting full-charge current value inputted to the input terminal (+) of the operational amplifier 98 is low. Thus, the full-charge detecting circuit 90 shows the full-charge current value (the end current value) when the battery temperature is low.

On the contrary, when the battery temperature of the battery pack 2 during the charging operation is not lower than 0° C., since an input value inputted to the operational amplifier 127 of the setting current switching circuit 120 is lower than the reference value, the output of the operational amplifier 127 is high. Thus, the transistor 128 is turned on, so that the transistors 86 and 99 in the charging current setting circuit 80 and the full-charge detecting circuit 90 respectively maintain a turned off state. Thus, the voltage values obtained by the voltage dividing ratio of the resistance 81 and 82 and the voltage dividing ratio of the resistance 92 and the resistance 93 are sets as the reference values of the charging current value and the end current value. Here, the combined parallel resistance value of the resistance 82 and the resistance 83 is smaller than the resistance 82. Further, the combined parallel resistance value of the resistance 93 and the resistance 94 is smaller than the resistance 93. That is, assuming that the charging current i1 and the setting full-charge current (the end current) is i2 when the battery temperature is not higher than 0° C., and the charging current is i3 and the setting full-charge current (the end current) is i4 when the battery temperature is not lower then 0° C., a relation of i1<i3 and i2<i4 is established and a suitable current value can be selected to carry out a charging operation depending on the battery temperature of the battery pack 2.

Figure 2:
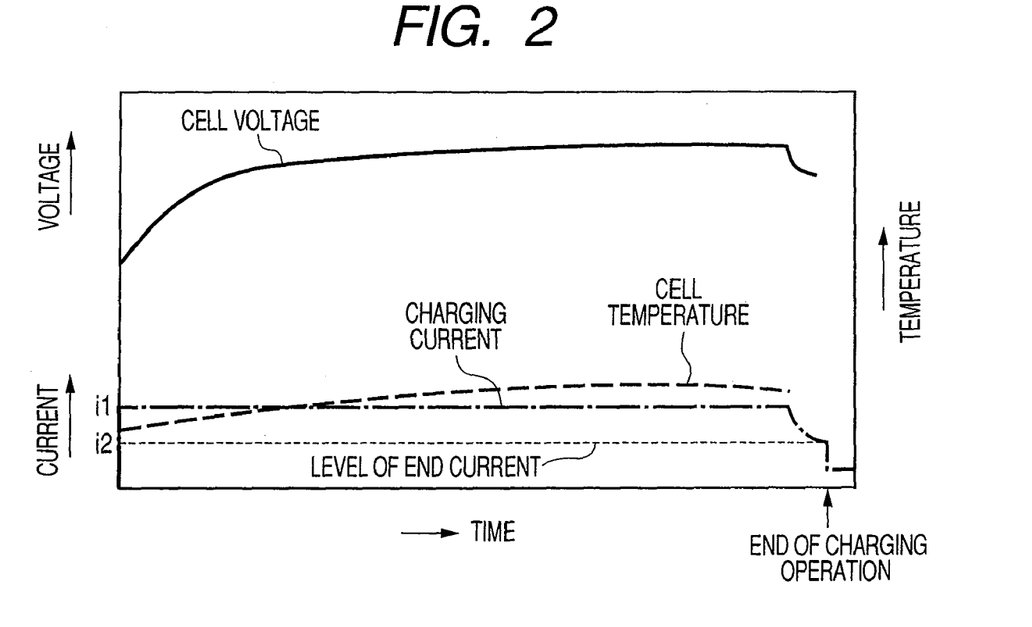
FIG. 2 is a charging characteristic view when a battery temperature is 0° C. or lower in the battery charger shown in FIG. 1.
Figure 3:
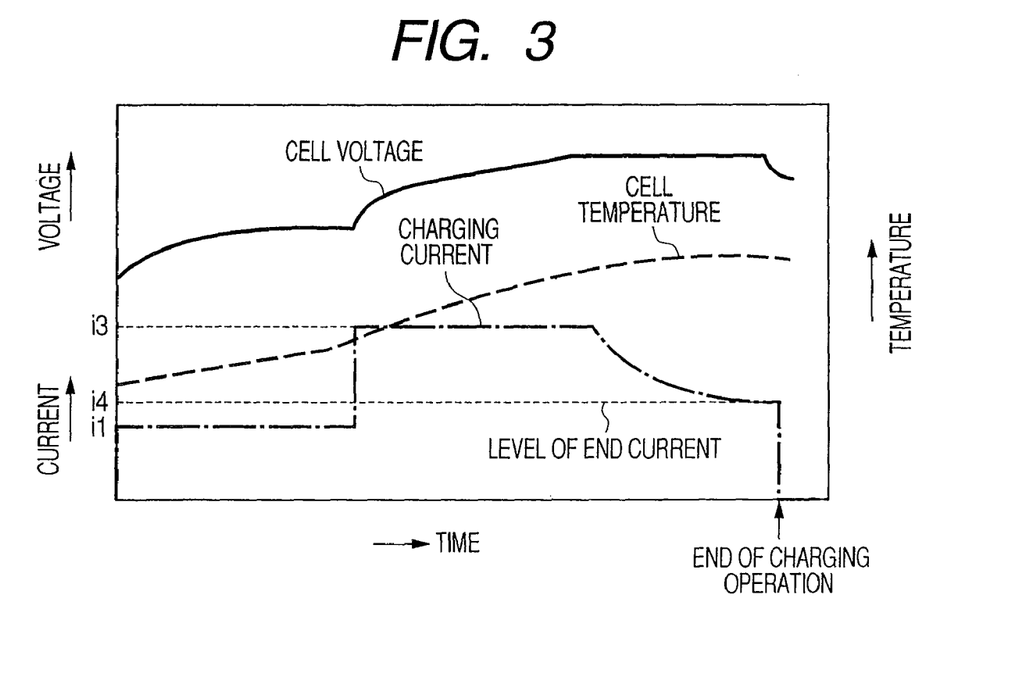
FIG. 3 is a charging characteristic view when the battery temperature of 0° C. or lower during a start of a charging operation changes to 0° C. or higher during the charging operation in the battery charger shown in FIG. 1.
Figure 4:
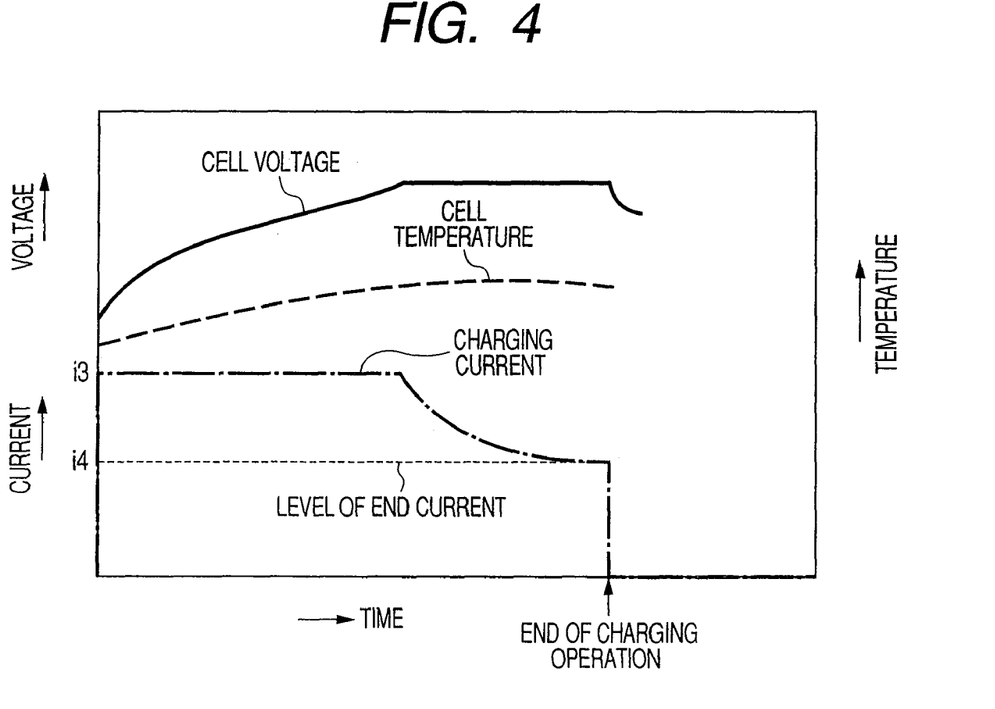
FIG. 4 shows a charging characteristic view when the battery temperature is 0° C. or higher in the battery charger shown in FIG. 1.

Examples of charging characteristic views of the battery charger 300 according to the present invention are shown in FIGS. 2 to 4. FIG. 2 shows the charging characteristic view when the battery pack of 0° C. or lower is charged. FIG. 3 shows the charging characteristic view when the battery pack of 0° C. or lower during a start of a charging operation changes to the battery pack of 0° C. or higher during the charging operation. FIG. 4 shows the charging characteristic view when the battery pack of 0° C. or higher is charged, respectively.

The charging characteristic view illustrated in FIG. 2 shows an example in which the battery temperature of the battery pack 2 is −10° C. during the start of the charging operation, the charging current i1 is 1 A, the battery temperature is −2° C. to −3° C. at the time of finishing the charging operation and the end current (the full charge current) i2 of the charging current is 0.5 A.

The charging characteristic view illustrated in FIG. 3 shows an example in which the battery temperature of the battery pack 2 is −2° C. to −3° C. during the start of the charging operation, the charging current i1 is 1 A, the battery temperature is 17° C. to 18° C. at the time of finishing the charging operation and the end current (the full charge current) i4 of the charging current is 1 A. In this case, since the battery temperature exceeds 0° C. during the charging operation, the charging current is switched to i3=3 A from i1=1 A and the end current is also switched to i4=1 A from i2=0.5 A. The charging time can be more shortened than that shown in FIG. 2

The charging characteristic view illustrated in FIG. 4 shows an example in which the battery temperature of the battery pack 2 is 10° C. during the start of the charging operation, the charging current i3 is 3 A, the battery temperature is 17° C. to 18° C. at the time of finishing the charging operation and the end current (the full charge current) i4 of the charging current is 1 A. In this case, the charging time can be more shortened than that shown in FIG. 3. As shown in FIGS. 2 to 4, in this embodiment, a low current charging operation is carried out at the low temperature by considering the life of the battery pack. Further, since the charging current is increased as the battery temperature rises, the life of the battery pack is considered and the charging time can be decreased at the same time.

In the above-mentioned embodiment, as one example, one comparator 127 is used in the setting current switching circuit 120 to vary the setting charging current value and the setting full-charge current value. However, many comparators may be used so that the setting charging current value and the setting full-charge current value can be finely switched.

As apparent from the above-described embodiment, according to the battery charger of the present invention, since the operational amplifier or the voltage comparator is used to adjust the level of the charging current supplied to the secondary battery to be charged and the level of the full charge current (the end current) in response to the battery temperature, the full-charge corresponding to the battery temperature can be discriminated under the constant current/constant voltage control by an inexpensive control circuit without using an expensive microcomputer.

The present invention proposed by the inventor is specifically described on the basis of the embodiment, however, the present invention is not limited to the above-described embodiment, and various changes may be made within a scope without departing the aspect thereof.

The invention claimed is:

1. A battery charger comprising:
a charging current control circuit for controlling a charging current to a set charging current value;
a full-charge detecting circuit for generating a charging stop signal when the charging current is not higher than a set full-charge current value; and
a battery temperature detecting unit for detecting the battery temperature of a secondary battery to be charged, said battery charger including:
a setting current switching circuit having a comparator for inputting a battery temperature signal corresponding to the battery temperature detected by the battery temperature detecting unit and a reference signal corresponding to a reference temperature to vary the set charging current value and the set full-charge current value correspondingly to the output of the comparator,
wherein the charging current control circuit and the full-charge detecting circuit include a voltage dividing resistance circuit, and the set charging current value and the set full-charge current value are switched depending on whether or not a voltage dividing value adjusting resistance is connected in parallel with a voltage dividing resistance forming the voltage dividing resistance circuit in accordance with the output of the setting current switching circuit.

2. A battery charger according to claim 1, wherein the battery temperature detecting unit detects the resistance change of a temperature sensing element incorporated in the secondary battery to be charged.

3. A battery charge according to claim 1, comprising:
a charging current setting unit setting a charging current signal; and
a full charge current setting unit setting a full charge current value.

4. A battery charger according to any one of claims 1 to 3, wherein the battery temperature is a low temperature within a prescribed temperature range, the setting current switching circuit sets the set charging current value and the set full-charge current value to values lower than those at high temperature.

5. A battery charger according to any one of claims 1 to 3, wherein the set charging current value, the set full-charge current value, the battery temperature signal and the reference signal represent voltage values respectively corresponding to the set charging current value, the set full-charge current value, the battery temperature and the reference temperature.

6. A battery charger according to any one of claims 1 to 3, wherein the secondary battery to be charged is a lithium battery charged under a constant current/constant voltage control.

7. A battery charger according to any one of claims 1 to 3, wherein the charging current control circuit has a second comparator; a charging signal responding to the charging current is inputted to one input terminal of the second comparator and a set charging signal corresponding to the set charging current value set in accordance with the output of the setting current switching circuit is inputted to the other input terminal of the second comparator, and the full-charge detecting circuit has a third comparator, a charging signal responding to the charging current is inputted to one input terminal of the third comparator and a set full-charge signal corresponding to the set full-charge current value set in accordance with the output of the setting current switching circuit is inputted to the other input terminal of the third comparator and the set charging current value and the set full-charge current value are varied relative to temperature by the setting current switching circuit.

* * * * *